Nov. 10, 1964         E. H. REPLOGLE            3,156,174
            PRESSURE REDUCING REGULATOR
                Filed July 25, 1960

INVENTOR.
Edward H. Replogle
BY
Walter H. Popp.
ATTORNEY.

United States Patent Office 3,156,174
Patented Nov. 10, 1964

3,156,174
PRESSURE REDUCING REGULATOR
Edward H. Replogle, Buffalo, N.Y., assignor to Scott Aviation Corporation, Lancaster, N.Y.
Filed July 25, 1960, Ser. No. 45,019
5 Claims. (Cl. 98—1.5)

This invention relates to a regulator for maintaining substantially constant the fluid pressure within an enclosure, and relates more particularly to manitaining substantially constant the pressure within an airborne enclosure where the desired volumes of fluid flow and the pressure within the enclosure sometimes change with extreme rapidity.

The main object of this invention is to accurately maintain a constant pressure in an enclosure—not only when the volume of the fluid flow is very low, but also when a large volume of fluid flow is needed, but without unduly departing from the desired constant pressure. In particular, it is the main object of the invention to provide a pressure regulator which will provide a very rapid repressurization of an enclosure subsequent to a previous, sudden decompression of said enclosure resulting from a fracture in the enclosure wall.

Other objects of my invention and practical solutions thereof are disclosed in the herein specification and illustrated in the accompanying drawing, wherein.

Figure 1:
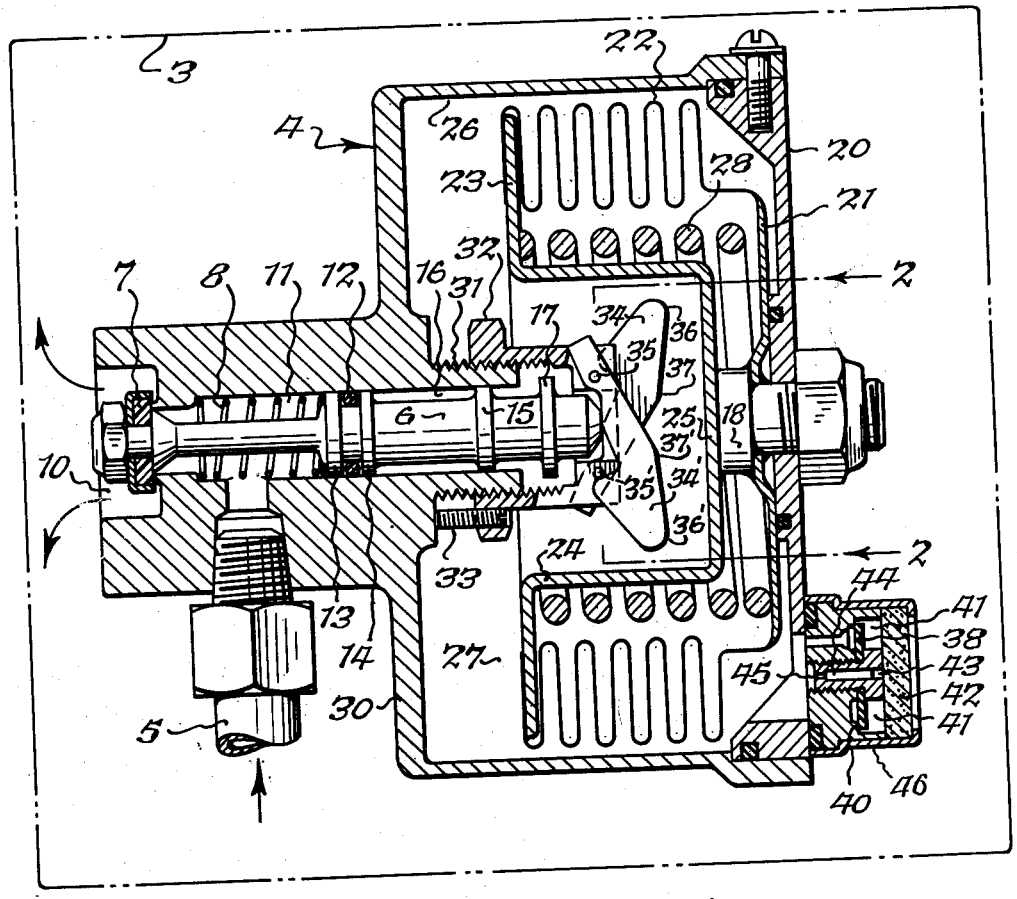
FIG. 1 is a partially schematic view showing my improved pressure regulator in medial, longitudinal section.

For convenience, my invention will be described exactly as it is illustrated, but it is to be understood that the scope of my invention is to be measured solely by its intrinsic novelty and by the breadth of the appended claims.

The double-dot-dash line 3 represents, in diagrammatic fashion, some sort of enclosure, such as the interior of an airplane or the interior of an ejectable capsule carried within an airplane, both up to the time of its ejection and subsequently to said ejection. It is the air pressure within this enclosure 3 with which the present invention is concerned.

Arranged within said enclosure 3 is a regulator casing 4 which is suitably fed by high pressure air through an inlet pipe 5. Slidably and longitudinally arranged in said regulator casing 4 is a thrust rod 6 at whose outer (left) end is arranged a regulating valve 7 which is resiliently urged toward its closed position by a light, helical, compression spring 8. This regulating valve 7 controls the flow of compressed air from the high pressure inlet pipe 5 to the regulator outlet 10, from whence it flows to the interior of the enclosure or compartment 3. Leakage of air between the high pressure valve chamber 11 and the interior of the regulator casing 4 is prevented by an O ring 12 which is confined between a pair of annular collars 13 and 14 that are integrally formed at the central part of said thrust rod 6. Said thrust rod 6 is also provided with a guide collar 15 which is slidably arranged in a cylindrical bore 16 suitably formed in the regulator casing 4. Said thrust rod 6 is also provided near its inner end with an integral, movement-limiting collar 17 whose function is to limit the longitudinal movement of said thrust rod in the one or other direction.

Secured by a draw bolt 18 to the rear (right) or cover plate 20 of the regulator casing 4 is a rear aneroid disk or fixed aneroid wall 21 which is hermetically secured to the rear end of a metal bellows or aneroid 22. The front (left) end of said aneroid 22 is hermetically sealed to an aneroid head 23 which is rearwardly and coaxially dished out integrally and cylindrically at 24 to compactly receive the rear end of the thrust rod 6 and its appurtenances.

Integrally formed at the rear end of said dished out portion 24 is what I shall refer to as a movable wall 25 so as to indicate, semantically, that this whole anerord arrangement could, if desired, be replaced by a piston which is slidably arranged in the cylinder 26—the front wall of said piston constituting a "movable wall" whose function would be exactly the same as the movable wall 25 here illustrated.

Figure 2:
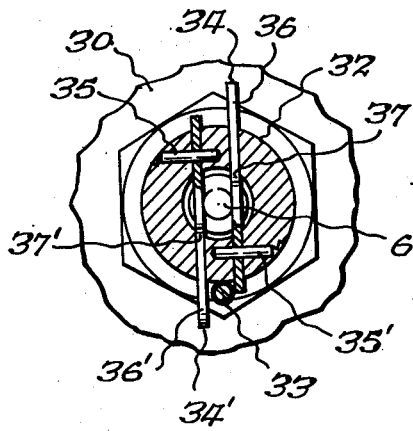
FIG. 2 is a fragmentary, vertical, transverse section thereof, taken on line 2—2, FIG. 1.

When the air pressure in the enclosure 3 and in the interior 27 of the regulator casing 4 drops a sufficient amount, the heavy compression spring 28 of the aneroid 22 resiliently pushes the movable wall 25 forwardly (to the left) away from the front face of the head of the draw bolt 18, and, near the end of its forward stroke, pushes the thrust rod 6 forwardly to open the regulating valve 7 in a novel manner now to be described:

The front wall 30 of the regulator casing 4 has integrally and coaxially formed on its rear face an annular, hollow, cylindrical boss 31 whose periphery is screw threaded to receive the female, screw threads of an adjustment collar 32 which, after being adjusted, is locked in its adjusted position by a set screw 33. The rear end of this adjustment collar is obliquely milled out at two places (see FIG. 2) to receive a pair of variable-leverage levers 34 and 34' which are pivoted by companion pivot pins 35 and 35' to said adjustment collar 32. The central front portion of each of these variable-leverage levers 34, 34' are arranged to bear against the transverse rear end or face of the thrust rod 6.

These variable-leverage levers 34, 34' are so shaped that, as the movable wall 25 moves forwardly, it first contacts the outer lobes 36, 36' of said levers which lobes are located at the outer extremities of said levers. This means that for a large movement of said movable wall 25, a relatively small movement of the regulating valve 7 results as a consequence. This occurs just at the time when said regulating valve 7 is being cracked open, and hence provides a very close pressure adjustment for small volumes of fluid flow.

As the movable wall 25 continues to move forwardly, it comes in contact with the inner lobes 37, 37' of the variable leverage levers 34, 34', and, as these inner lobes 37, 37' are much closer to the lever pivots 35, 35', it follows that from this point on, the regulating valve 7 is moved a considerable distance for a small movement of the movable wall 25. This means that approximately a proper air pressure is maintained in the enclosure 3, even when the volume of flow is very high, because of the reduction in the "throttling" action through the regulating valve 7 at high volume air flows.

By providing a balanced set of levers 34, 34', the thrust rod 6 receives only coaxial, thrust pressures and is relieved of any oblique pressures.

In addition to providing the variable-leverage levers 34, 34' with the inner lobes 37, 37', so as to open the regulating valve 7 very rapidly at the end of the forward movement of the movable wall 25, this invention also provides for large fluid flows by balancing the pressures imposed against the inner face of the regulating valve 7. This balancing is obtained by having the cylindrical bore 16 (in which the outer, annular collar 13 is slidably arranged) of susbtantially the some diameter as the diameter of the valve seat of the regulating valve 7.

Actually, the regulator valve 7 is slightly overbalanced by having the diameter of the cylindrical bore 16 slightly larger than the diameter of the regulator valve 7. Hence the total fluid pressure against the front (left) face of said annular collar 13 is slightly more than the total fluid pressure against the rear (right) face of the regulating valve 7. This arrangement enables the helical compression spring 8 to be very light and yet to reliably close said regulating valve, and, at the same time, enables said regulating valve 7 to function properly even though the fluid pressure in the high pressure valve chamber 11 varies between relatively large extremes.

If the airplane ascends or descends at a normal rate of speed with a normal amount of cabin leakage, the interior 27 of the regulator casing 4 could be vented directly to enclosure 3. However, it is occasionally necessary to very rapidly re-pressurize this enclosure 3 after a previous sudden decompression which has resulted from a fracture of a wall of said enclosure or, when this enclosure constitutes the interior of a capsule, and the doors of said capsule have been previously opened for one reason or another. Such a rapid re-pressurization requires a somewhat more complicated means of controlling the flow of air between the enclosure 3 and the interior 27 of the regulator casing 4.

When a sudden decompression occurs, the flow of air through inlet pipe 5 is preferably cut off, of course, so as to prevent large volumes of the compressed air from being wasted. Then the fracture in the wall of the enclosure 3 is suitably sealed off (or the doors of the capsule closed). Thereupon, the flow of high pressure air through inlet pipe 5 is again restored—the regulator valve 7 being wide open at this time.

One of the objects of this invention is to re-pressurize the enclosure 3 in the shortest possible period of time. To do this, it is important that the regulator valve 7 remain fully open until this result is full accomplished.

Any instrument, such as a pressure regulator, which functions in accordance with a control agent with which it is not mechanically connected, is apt to lag in its response to changes in the character of said control agent, because of inertia (or momentum), friction, etc. Specifically, most regulators tend to throttle their output and approach their final predetermined regulated pressure with a lag of sensitive response.

For convenience (because of its mathematical implications) I shall term this lag of response the asymptotic effect, and, to eliminate this asymptotic effect, when rapidly re-pressurizing, I simply restrain or throttle the flow of air from the enclosure 3 into the interior 27 of the regulator casing 4.

I avoid the foregoing undesirable asymptotic effect as follows: Upon the cover 20 of the regulator casing 4, I mount a sheet metal vestibule 46 whose interior communicates with the interior 27 of the regulator casing 4, and whose exterior opens into the air contained within enclosure 3. In the outer part of said vestibule I mount a filter 42 to prevent dusty air from entering the regulator. Air passing inwardly through said filter 42 passes into a transverse slot 43 and thence through a coaxial duct 44 and a metered orifice 45 to the interior 27 of the regulator casing 4.

Air moving outwardly or being vented from the interior of the regulator casing 4 opens the rubber check valve 38 away from its valve seat 40 and said vented air thence flows into an outlet chamber 41 which leads the vented air out through the filter 42 and out into the enclosure 3. This check valve 38 prevents air from flowing inwardly, except through orifice 45, when the air is passing inwardly through the filter 42.

I claim:

1. A pressure regulator for controlling the fluid pressure within an enclosure comprising, in combination with an enclosure, a regulator having a casing, means placing an interior part of said casing in communication with said enclosure, a wall movable in said casing part in response to variations in pressure in said enclosure, a high pressure fluid inlet to said casing, a regulated pressure fluid outlet from said casing communicating with said enclosure, a regulating valve controlling the flow of pressure fluid from said inlet through said outlet, means resiliently urging said valve into a closed position, a thrust rod connected to said valve, and a balanced pair of variable-leverage levers movably connected to said casing for engagement with said thrust rod, said levers being arranged for actuation by said wall to move said rod and thereby open said valve upon a decrease in pressure within said enclosure.

2. A pressure regulator for controlling the fluid pressure within an enclosure comprising, in combination with an enclosure, a regulator having a casing, means placing an interior part of said casing in communication with said enclosure, said means throttling the flow of fluid into said casing part while allowing fluid to flow freely out of said casing part, a wall movable in said casing part in response to variations in pressure in said enclosure, a high pressure fluid inlet to said casing, a regulated pressure fluid outlet from said casing communicating with said enclosure, a regulating valve controlling the flow of pressure fluid from said inlet through said outlet, means resiliently urging said valve into a closed position, a thrust rod slidable in said casing and connected with said valve, and a balanced pair of variable leverage levers movably connected to said casing for engagement with said thrust rod, said levers being arranged for actuation by said movable wall to move said rod and thereby open said valve upon a decrease in pressure within said enclosure.

3. A pressure regulator for controlling the fluid pressure within an enclosure comprising, in combination with an enclosure, a regulator having a casing, means placing a part of said casing in communication with said enclosure, a wall movable in said casing part in response to variations in pressure in said enclosure, a high pressure fluid inlet to said casing, a regulated pressure fluid outlet from said casing communicating with said enclosure, a regulating valve controlling the flow of pressure fluid from said inlet through said outlet, means resiliently urging said valve into a closed position, a thrust rod slidable in said casing and connected with said valve, a balanced pair of variable-leverage levers, and means mounting said levers on said casing for engagement with said thrust rod, said levers being arranged for actuation by said movable wall to move said rod and thereby open said valve upon a decrease in pressure within said enclosure, said lever mounting means being adjustable to vary the position of said levers relative to said wall.

4. A pressure regulator for controlling the fluid pressure within an enclosing comprising, in combination with an enclosure, a regulator having a casing, means placing an interior part of said casing in communication with said enclosure, a wall movable in said casing part in response to variations in pressure in said enclosure, a high pressure fluid inlet to said casing, a regulated pressure fluid outlet from said casing communicating with said enclosure, a regulating valve controlling the flow of pressure fluid from said inlet through said outlet, means resiliently urging said valve into a closed position, a thrust rod slidable in said casing and connected to said valve, a collar on said thrust rod, said valve and said collar being exposed to high pressure fluid from said inlet with the inlet pressure fluid acting against said valve in a direction to open the same while acting against said collar in a direction to close said valve, the area of said collar exposed to pressure fluid from said inlet at least equaling the area of said valve exposed to pressure fluid from said inlet when said valve is closed, and a balanced pair of variable-leverage levers movably connected to said casing for engagement wtih said thrust rod, said levers being arranged for actuation by said movable wall to move said rod and thereby open said valve upon a decrease in pressure within said enclosure.

5. A pressure regulator for controlling fluid pressure within an enclosure comprising a casing, a wall movable in said casing in response to variations in pressure, a high pressure fluid inlet to said casing, a regulated pressure fluid outlet from said casing, a regulating valve controlling the flow of pressure fluid from said inlet through said outlet, means resiliently urging said valve into a closed position, a thrust rod carried by said casing and connected to said valve, and a balanced pair of variable-leverage levers pivotally connected to said casing for engagement with said thrust rod, said levers each having first and second lobes with the second lobes spaced further from the respective pivot axes than the first lobes, said wall being movable upon a decrease in pressure within said enclosure first against said second lobes and then against said first lobes to move said rod and thereby open said valve with a relatively small initial movement followed by a relatively large opening movement.

References Cited in the file of this patent

UNITED STATES PATENTS

| | | |
|---|---|---|
| 687,002 | Cash | Nov. 19, 1901 |
| 2,302,284 | Abbott | Nov. 17, 1942 |
| 2,596,178 | Seeler | May 13, 1952 |
| 2,805,039 | Angelery | Sept. 3, 1957 |
| 2,919,711 | Lord et al. | Jan. 5, 1960 |

FOREIGN PATENTS

| | | |
|---|---|---|
| 11,225 | Great Britain | 1900 |